United States Patent [19]

Rogers

[11] Patent Number: 4,917,393
[45] Date of Patent: Apr. 17, 1990

[54] TWO WHEEL TROLLEY FOR CARRYING BAGS

[76] Inventor: Ralph J. Rogers, 46280 - 3rd Ave., Chilliwack, B.C., Canada, V2P 1R8

[21] Appl. No.: 316,361

[22] Filed: Feb. 27, 1989

[51] Int. Cl.⁴ ............................................. B62B 1/04
[52] U.S. Cl. .................................. 280/47.28; 53/370; 53/390; 248/98; 248/99; 248/129; 248/349; 414/456
[58] Field of Search .................. 280/47.28; 298/2; 414/444, 446, 450, 453, 455, 456, 490; 248/98, 99, 128, 129, 349; 53/370, 390, 570

[56] References Cited

U.S. PATENT DOCUMENTS

| | | | |
|---|---|---|---|
| 228,733 | 6/1880 | Curtis | 248/98 |
| 3,633,932 | 1/1972 | Holden | 280/36 R |
| 3,754,771 | 8/1973 | Shagoury | 280/36 C |
| 3,935,692 | 2/1976 | Miller | 53/370 |
| 4,031,689 | 6/1977 | Sullivan | 53/370 |
| 4,202,521 | 5/1980 | Harding | 248/98 |
| 4,448,434 | 5/1984 | Anderson | 280/40 |

Primary Examiner—Charles A. Marmor
Assistant Examiner—Eric Culbreth
Attorney, Agent, or Firm—Townsend and Townsend

[57] ABSTRACT

A trolley holds a container such as a plastic bag or sack in the open position for filling and has a rotatable table at the base which allows the bag to be twisted when at least partially full for tying and sealing. The trolley comprises two upright members forming a rigid frame with a short platform at the base, a rotatable table to hold the container is supported on a leg pivoted out from the platform, the table has skirt protector strips to prevent corners of the bag overlapping the table, and flexible support arms extending out from the two upright members with external ends to hold open the container resting on the table, the support arms being movable down in line with the two upright members to take into account different sized containers, and to allow the top of the container to be lowered when twisted on the table.

5 Claims, 2 Drawing Sheets

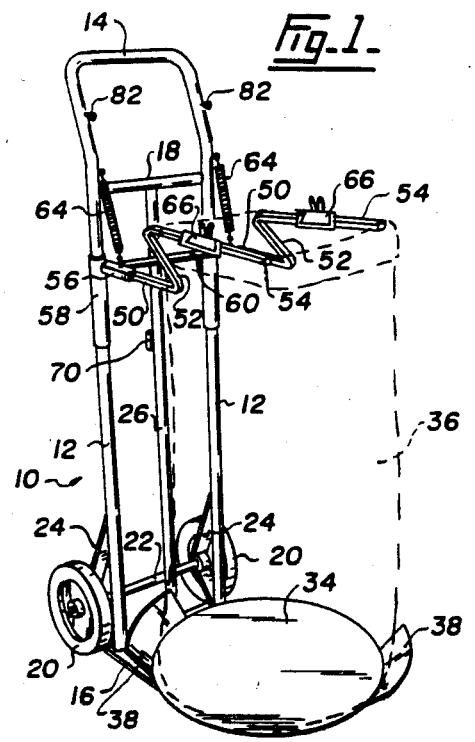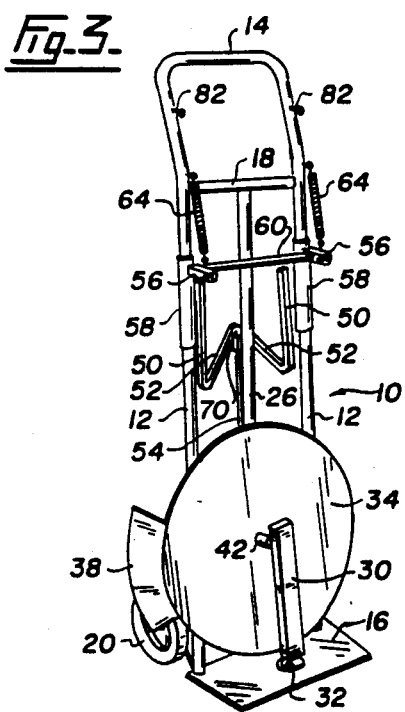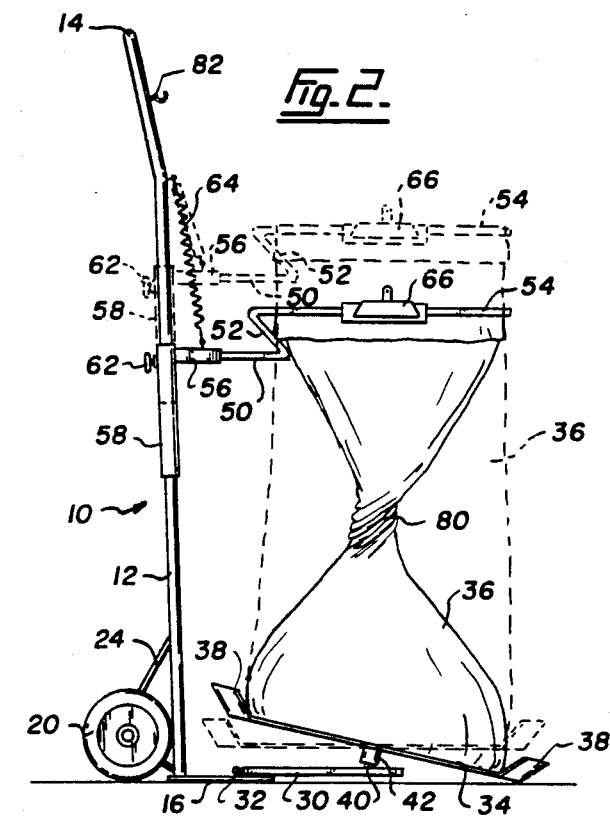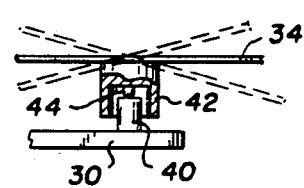

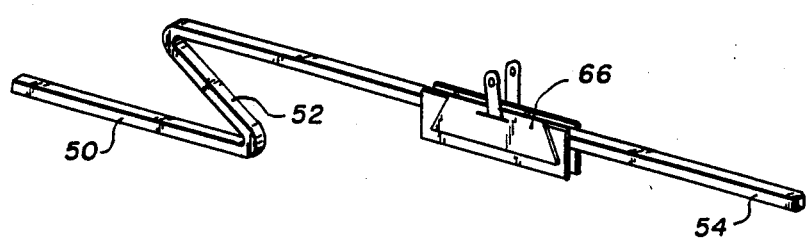
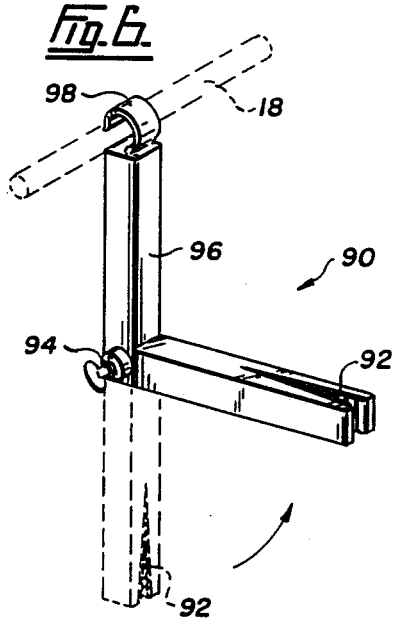

TWO WHEEL TROLLEY FOR CARRYING BAGS

The present invention relates to a trolley for supporting a plastic bag in the open position. More specifically the present invention relates to a trolley having a rotating table at the base and flexible arms at the top that permit a bag to be held in an open position, and then when full, the bag may be twisted on the table permitting the twisted neck to be locked or tied.

The use of asbestos today has been greatly reduced due to environmental and health problems resulting in asbestos being present in tank linings, furnace linings and other areas where asbestos fibers may become mixed with air in an enclosed space. It has been found that asbestos in these conditions is hazardous to one's health and therefore there is now a requirement in many existing buildings to have these fibers removed and contained in such a way that they cannot escape into the air. When removing asbestos fibers those doing this work generally wear protective breathing equipment. The asbestos fibers are sprayed with water so they are wet and fibers are not released into the air. The fibers are then placed in bags and the like which are carefully tied up and sealed so that no asbestos fibers can escape. When working in enclosed areas, such as buildings, tanks, furnaces and the like, it is generally difficult to hold a bag open and fill it with asbestos because this requires at least two people. Furthermore if one uses the normal bag holders, one is not able to seal the bag without removing it from the holder. Bags full of wet asbestos fibers are heavy and difficult to move. Furthermore, the bags are generally made of plastic which can be torn if not handled carefully.

In order to ensure that the bag is properly sealed when filled with asbestos, it is generally only partially filled, as the weight of the wet asbestos fibers is too great to completely fill the bag. The neck of the bag is twisted to provide a good seal at the twist. Twist ties, and twine or locking devices are used to seal the bag closed even though it is only partially filled.

It is an aim of the present invention to provide a reasonably lightweight trolley which has a rotatable table at its base to support a bag, and two arms extending out one on each side of an upright frame which are provided to grip and hold open the top of the bag. Then when the bag is full, it is merely necessay for an operator to turn the rotatable table with the bag resting thereon, and because the top edges are held to the flexible arms, the bag twists and it is a fairly straightforward matter to put a tie or other type of locking device around the twist to seal the bag.

There is also provided a lightweight trolley that has a rotatable table at its base, for supporting bags, sacks and other types of flexible containers, and has arms at the top that support and hold open the top of the container so it may be filled and the table at the base rotated so the neck of the bag can be tied. The trolley allows one person to fill a bag rather than two and has the added advantage of being easily closed, and then wheeled to a loading or storage area.

The present invention provides a two wheel trolley for holding a flexible container comprising two upright members, each member extending down from a handle portion to a short platform between bottom ends of the two upright members, the upright members spaced apart and joined as a rigid frame; a pair of wheels, each wheel located adjacent to the lower ends of the upright members, positioned to support and transport the trolley when the upright members are tipped back; a rotatable table to hold the container, the table supported on a leg pivoted out from the short platform, the table having a stored position when the leg is pivoted up against the upright members; opposing skirt protector strips on the rotatable table to prevent corners of the bag overlapping the table; flexible support arms extending out from the two upright members with external ends to hold open the container resting on the table, the support arms having means to move down in line with the two upright members to take into account different sized containers, and to allow the top of the container to be lowered when twisted on the table, and grip means to hold the open edges of the container and support the container from the support arms.

In drawings which illustrate the embodiments of the present invention:

FIG. 1 is an isometric view showing one embodiment of a two wheel trolley for holding a plastic bag according to the present invention, FIG. 2 is a side view of the trolley shown in FIG. 1 with a plastic bag twisted on a rotatable table, FIG. 3 is an isometric side view of the trolley shown in FIG. 1 with the table folded up, and the arms stored, FIG. 4 is a partial section or side view illustrating the connection between the rotatable table and the support from the pivot arm, FIG. 5 is an isometric view of a flexible support arm with a gripping device to hold the edges of a bag or sack, FIG. 6 is an isometric view of an attachment for the trolley to slip over the top cross bar and hold the top of a bag or sack.

The basic trolley is similar to the well known trolleys used for lifting loads in warehouses and the like today. FIG. 1 illustrates the trolley 10 having two upright members 12 which extend from a handle portion 14 at the top to a short platform 16 at the base. A top crossbar 18 holds the two upright members 12 together, and a pair of wheels 20 on an axle 22 is supported by angle frames 24 attached to the lower ends of the upright members 12 in such a position, so that when the two wheel trolley is in the upright position, the short platform 16 rests on the ground, and is supported in that position by the wheels 20. By pulling down on the handle portion 14, the upright members 12 pivot upwards so the trolley may be transported on the wheels 20. A centre upright member 26 extends up from the rear of the short platform 16 to the top crossbar 18 to provide a rigid trolley.

A pivot leg 30, as shown in FIGS. 2 and 3 is attached by a pivot 32 to the short platform 16 and at the exterior end supports a rotatable table 34 to hold a plastic bag 36. The rotatable table 34 has skirt protector strips 38 on opposing sides to prevent the corners of a bag from overlapping the table 34 when filled with wet asbestos.

FIG. 4 illustrates details of the rotatable table 34 mounting, wherein a stub shaft 40 is welded to the end of the leg 30. A short cylindrical member 42 is welded to the centre of the underside of the table 34 and has a ball 44 welded at the centre. The inside diameter of the cylindrical member 42 is larger than that of the stub shaft 40. The ball 44 of the table 34 sits on the stub shaft 40 and the table 34 can rotate and also tilt a certain amount, restricted by the difference in diameter between the stub shaft 40 and the cylindrical member 42. When not in use the rotatable table can be lifted off and stored, or tilted up on leg 30 into a stored position as shown in FIG. 3. The leg 30 is also detachable from the trolley.

Two flexible arms 50 extend out from each of the upright members 12, and have a Z-bend 52 therein, as shown in FIG. 5, which terminates at an external end 54. The flexible arms 50 are made from a square rod and fit into a section of square tube 56 which is welded to a section of pipe 58 slidingly mounted on each upright member 12. A brace 60 joins the two sections of pipe 58 together so they slide up and down the upright members 12 together. Clamps 62 allow two sections of pipe 58 to be clamped in a fixed position.

Two springs 64 are joined to attachments at the top of the upright members 12 and connect to the square tubes 56. The springs act to pull the two sections of pipe 58 upwards, but allows the flexible arms 50 to be pulled down when the weight of the bag pulls them down.

A clip 66, which is illustrated in FIG. 5, is similar in design to a large binder clip and fits over the external ends 54 of the flexible arms 50 to grip the edges of a container, such as a bag or sack, and hold them to the arms 50. The two flexible arms 50 can be removed from the square tubes 56 and stored by fitting them into a rack 70 at the back of the centre upright member 26 as shown in FIG. 3.

In operation a container, such as a bag, is first placed with the bottom two corners opposite the skirt protector strips 38, and the open end upwards folded over the external ends 54 of the flexible arms 50. The flexible clips 66 are pressed over the external ends 54 to hold the edges of the bag 36 in place. In this form the bag is ready for filling with the ends open. Wet asbestos is placed in the bag. The weight of the wet asbestos is such that most bags can only be filled half full. Bags filled beyond this amount generally tend to be too heavy to handle or alternatively can split while being moved.

To seal the bag 36 it is now necessary to rotate the rotatable table 34 at the base and a twist 80 as shown in FIG. 2 occurs above the product in the bag and below the flexible arms 50. Several twists may occur and as this happens the flexible arms 50 move downwards against the spring 64. The material in the bag is kept in the centre as the bag rotates about its substantially vertical axis. When several twists have been placed in the bag a seal or twist is applied at the most twisted portion of the bag to tie the bag and seal. The flexible clips 66 are then released and the arms 50 move upwards pulled up by the springs 64. The bag is then removed from the rotatable table 34 and a new bag put in place.

The trolley may be used for other containers which can be completely filled. Such uses may include agriculture uses such as picking fruit or vegetables. Hooks 82 on the handle portion 14 are for tall bags or sacks. FIG. 6 illustrates a clip 90 for holding a top of a sack or bag closed to allow one person to place a tie on the bag. The clip 90 has a V-groove portion 92 which grips the top of a sack or bag. The V-groove portion 92 extends from a hinged position with a lock 94 attached to a member 96 having a hook 98 to fit over the top crossbar 18.

Various changes may be made to the embodiments shown herein without departing from the scope of the present invention which is limited only by the following claims.

The embodiments of the present invention in which an exclusive property or privilege is claimed are defined as follows:

1. A two wheel trolley for holding a flexible container comprising:
   two upright members, each member extending down from a handle portion to a short platform between bottom ends of the two upright members, the upright members spaced apart and joined as a rigid frame;
   a pair of wheels, each wheel located adjacent to the lower ends of the upright members, positioned to support and transport the trolley when the upright members are tipped back;
   a rotatable table to hold the container, the table supported on a leg pivotally attached to the short platform, the table having a stored position when the leg is pivoted up against the upright members;
   opposing skirt protector strips on the rotatable table to prevent corners of the bag overlapping the table;
   flexible support arms extending out from the two upright members with external ends to hold open the container resting on the table, the support arms having means to move down in line with the two upright members to take into account different sized containers, and to allow the top of the container to be lowered when twisted on the table, and
   grip means to hold the open edges of the container and support the container from the support arms.

2. The trolley according the claim 1 wherein the rotatable table rests on a single point contact surface at the end of the arm, and has limited ability to be tipped in all directions.

3. The trolley according to claim 1 wherein the flexible support arms each have a Z-bend therein to allow the edges of the container to fold over the external ends.

4. The trolley according to claim 1 wherein the flexible support arms have a substantially square cross-section, one end of each arm fitting into a substantially square tube extending from a sliding member free to move up and down each of the two upright members, and spring means to retain the flexible arms at a high position to support a container.

5. The troley according to claim 4 wherein a clamp means is provided on each sliding member to clamp the flexible arms at any position on the two upright members.

* * * * *